United States Patent
Ahmed et al.

(10) Patent No.: US 12,037,446 B1
(45) Date of Patent: Jul. 16, 2024

(54) THERMOLUMINESCENCE SENSOR AND METHOD OF PREPARATION THEREOF

(71) Applicant: IMAM MOHAMMAD IBN SAUD ISLAMIC UNIVERSITY, Riyadh (SA)

(72) Inventors: Khalid Hassan Ibnouf Ahmed, Riyadh (SA); Osamah Abdulrahman Aldaghri, Riyadh (SA); Hajo Idriss Mohammed Idriss, Riyadh (SA); Ahmed Alsadig Ahmed, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 18/587,356

(22) Filed: Feb. 26, 2024

(51) Int. Cl.
*G01K 11/20* (2006.01)
*C08G 61/02* (2006.01)

(52) U.S. Cl.
CPC .............. *C08G 61/02* (2013.01); *G01K 11/20* (2013.01); *C08G 2261/1422* (2013.01);
(Continued)

(58) Field of Classification Search
CPC ............ C08G 61/02; C08G 2261/1422; C08G 2261/1424; C08G 2261/143;
(Continued)

(56) References Cited

U.S. PATENT DOCUMENTS 9,555,454 B2  1/2017  Pamukcu et al.
10,444,243 B2  10/2019  Chiu et al.
(Continued)

FOREIGN PATENT DOCUMENTS

CN  108250354 A  * 7/2018  ............. A61K 47/32
CN  116474093 A  7/2023
(Continued)

OTHER PUBLICATIONS

18587356_2024-04-23_KR_100746962_B1_H.pdf,Aug. 7, 2007.*
(Continued)

*Primary Examiner* — Gail Kaplan Verbitsky
(74) *Attorney, Agent, or Firm* — Oblon, McClelland, Maier & Neustadt, L.L.P.

(57) ABSTRACT

A thermoluminescence sensor includes a thermo-responsive polymer composition, and a sealed transparent container that holds the thermo-responsive polymer composition. The thermo-responsive polymer composition contains a curcumin oil, and a cyano derivative of poly(phenylenevinylene) of formula (I).

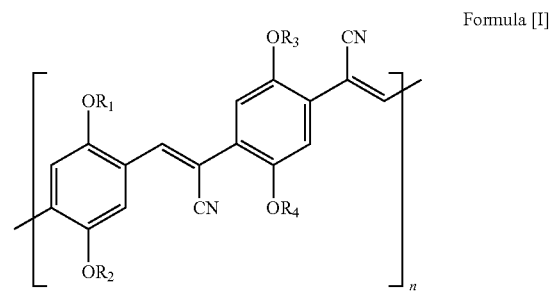

19 Claims, 5 Drawing Sheets (52) U.S. Cl.
CPC ............... *C08G 2261/1424* (2013.01); *C08G 2261/1428* (2013.01); *C08G 2261/143* (2013.01); *C08G 2261/18* (2013.01); *C08G 2261/228* (2013.01); *C08G 2261/312* (2013.01); *C08G 2261/3327* (2013.01); *C08G 2261/94* (2013.01)

(58) Field of Classification Search
CPC .......... C08G 2261/18; C08G 2261/312; C08G 2261/3327; C08G 2261/94; G01K 11/20
USPC ......................................... 374/162, 159, 161
See application file for complete search history.

(56) References Cited

U.S. PATENT DOCUMENTS

| | | | | |
|---|---|---|---|---|
| 2004/0137066 | A1* | 7/2004 | Jayaraman | A61K 31/436 424/486 |
| 2016/0303241 | A1* | 10/2016 | Duvall | A61K 9/06 |
| 2020/0038525 | A1* | 2/2020 | Jermy | A61K 49/0428 |

FOREIGN PATENT DOCUMENTS

| | | | | |
|---|---|---|---|---|
| CN | 116509794 B | * | 3/2024 | ......... A61K 41/0038 |
| KR | 100746962 B1 | * | 8/2007 | |
| KR | 100746962 B1 | * | 8/2007 | |
| KR | 10-1776110 B1 | | 9/2017 | |
| WO | WO-2024058065 A1 | * | 3/2024 | |

OTHER PUBLICATIONS

18587356_2024-04-23_CN_108250354_A_H.pdf,Jul. 6, 2018.*
18587356_2024-05-07_CN_110804115_A_H.pdf,202-02-18.*
18587356_2024-04-23_WO_2024058065_A1_H.pdf,Mar. 21, 2024.*
Soto-Quintero et al. ; Curcumin to Promote the Synthesis of Silver NPs and their Self-Assembly with a Thermoresponsive Polymer in Core-Shell Nanohybrids ; Scientific Reports 9 ; 2019 ; 14 Pages.
Cai et al. ; pH and light-responsive polycaprolactone/curcumin@zif-8 composite films with enhanced antibacterial activity ; Food Engineering, Materials Science, & Nanotechnology ; Jul. 13, 2021 ; 10 Pages.
Bellacanzone et al. ; Tunable Thermofluorochromic Sensors Based on Conjugated Polymers ; Adv. Optical Mater. 10 ; 2022 ; 11 Pages.

* cited by examiner

THERMOLUMINESCENCE SENSOR AND METHOD OF PREPARATION THEREOF

BACKGROUND

Technical Field

The present disclosure is directed to thermoluminescence sensors, and more particularly directed to a thermoluminescence sensor including conjugated polymer (PDH-CN) in curcumin oil.

Description of Related Art

The "background" description provided herein is to present the context of the disclosure generally. Work of the presently named inventors, to the extent it is described in this background section, as well as aspects of the description that may not otherwise qualify as prior art at the time of filing, are neither expressly nor impliedly admitted as prior art against the present invention.

Stimuli-responsive polymers, commonly known as "smart" polymers, are being undergoing research due to their applications in various fields, including optical sensors, optoelectronic devices, thermometers, and more. Stimuli-responsive polymers exhibit physicochemical reversible changes in response to external stimuli including, but not limited to, pH, temperature, ionic strength, magnetic or electric fields, chemical stimuli, and light.

Conjugated polymers, characterized by their chemical and physical properties, find applications in diverse areas, such as thermally induced optical macro-technology-based conjugated polymers. These properties make them particularly suitable for rapid thermal measurements by capitalizing on their response to temperature alterations, resulting in a change in color. Within this context, conjugated polymers of the phenylenevinylene and polythiophene families possess relevant thermochromic and thermo-fluorochromic properties with acceptable emission efficiencies in the visible range. However, due to their gradual optical changes over broad temperature ranges, their full potential in thermal sensor fabrication has not yet exploded. This is mainly due to the conformational states of polymers' chains, crystalline phase, or aggregation degree that continuously varies with temperature.

Conjugated polymers are often soluble in high-boiling-point, toxic solvents at elevated temperatures, which restricts their processability and applicability in the mass production of optoelectronic devices. In addition, the preparation conditions and solvent choice may impact the absorption and emission characteristics of the conjugated polymers. Therefore, exploration of an environmentally friendly and sustainable solvent is desirable.

U.S. Ser. No. 10/444,243B2 discloses a suspension containing chromophoric polymer particles. The chromophoric polymer particles have a polymer matrix formed from one or more chromophoric polymers, such as a poly[2-methoxy-5-(2-ethylhexyloxy)-1,4-(1-cyanovinylene-1,4-phenylene)]. However, U.S. Ser. No. 10/444,243B2 does not describe a curcumin oil, a cyano-substituted poly(phenylenevinylene) of formula (I), and an exciplex of formula (II).

KR1776110B1 discloses a temperature-responsive polymer having a core-shell structure. The temperature-responsive polymer includes one or more poly(phenylenevinylene). However, KR1776110B1 does not describe a curcumin oil, a cyano-substituted poly(phenylenevinylene) of formula (I), and an exciplex of formula (II).

U.S. Pat. No. 9,555,454B2 discloses a thermo-responsive poly(phenylenevinylene) polymer. However, U.S. Pat. No. 9,555,454B2 does not describe a curcumin oil, a cyano-substituted poly(phenylenevinylene) of formula (I), and an exciplex of formula (II).

CN116474093A discloses a thermo-responsive poly(N-phenylglycine) polymer. However, CN116474093A does not describe a curcumin oil, a cyano-substituted poly(phenylenevinylene) of formula (I), and an exciplex of formula (II).

Quintero et al. (*Sci. Rep.*, 2019) discloses a nanohybrid material containing a curcumin-capped AgNPs core, and a thermoresponsive polymer shell. However, the Quintero does not describe a cyano-substituted poly(phenylenevinylene) of formula (I), and an exciplex of formula (II).

Cai et al. (*J. Food Sci.*, 2021) discloses a polycaprolactone/curcumin modified ZIF-8. However, the Cai does not describe a cyano-substituted poly(phenylenevinylene) of formula (I), and an exciplex of formula (II).

Bellacanzone et al. (*Adv. Opt. Mater.*, 2022) discloses a thermofluorochromic material containing poly(phenylenevinylene). However, the Bellacanzone does not describe a cyano-substituted poly(phenylenevinylene) of formula (I), and an exciplex of formula (II).

The drawbacks of each of the materials and methods described above indicate that there is still a need for producing a thermo-responsive polymer composition that overcomes the drawbacks of the art. More importantly, the challenge is that such materials and methods should be cost-effective and rapid to attract industries to adopt these processes.

In view of the foregoing, it is one objective of the present disclosure to provide a thermoluminescence sensor. A second objective of the present disclosure is to provide a thermo-responsive sensing system. A third objective of the present disclosure is to provide a method for measuring temperature using the thermo-responsive sensing system. A fourth objective of the present disclosure is to provide a method of making a thermo-responsive polymer composition.

SUMMARY

In an exemplary embodiment, a thermoluminescence sensor is described. The thermoluminescence sensor includes a thermo-responsive polymer composition and a sealed transparent container that holds the thermo-responsive polymer composition. In some embodiments, the thermo-responsive polymer composition includes a curcumin oil, a cyano derivative of poly(phenylenevinylene) of formula (I).

Formula (I)

In some embodiments, at least a portion of the cyano derivative of poly(phenylenevinylene) is in the form of an exciplex with the curcumin oil.

In some embodiments, the exciplex has formula (II).

Formula (II)

In some embodiments, $R_1$, $R_2$, $R_3$, and $R_4$ are each independently selected from the group consisting of $C_1$-$C_9$ alkyl, $C_1$-$C_9$ alkenyl, $C_2$-$C_9$ alkynyl, $C_1$-$C_6$ alkyloxy-$C_1$-$C_6$ alkyl, $C_1$-$C_6$ alkylthio-$C_1$-$C_6$ alkyl, and $C_1$-$C_6$ alkylamino-$C_1$-$C_6$ alkyl. In some embodiments, each of the carbon-containing radicals is optionally substituted with one or more halogen atoms. In some embodiments, n is a positive integer.

In some embodiments, the cyano derivative of poly(phenylenevinylene) is poly(2,5-di(hexyloxy)cyanoterephthalylidene (PDH-CN). In some embodiments, the exciplex formation has formula (III).

Formula (III)

In some embodiments, the sensor exhibits a temperature-dependent emission intensity in a range from 450 nanometers (nm) to 800 nm at a temperature of 0 degrees Celsius (° C.) to 100° C., as determined by optical spectrum.

In some embodiments, the sensor exhibits a temperature-dependent emission intensity in a range of from 535 nm to 600 nm at a temperature of 0° C. to 100° C.

In some embodiments, there is a linear correlation between the operation temperature of the sensor and the emission characteristic during thermal cycling.

In some embodiments, the thermoluminescence sensor has a color change transition at a temperature of 0° C. to 100° C., and the color change transition has an emission intensity of from 450 nm to 800 nm as an increase of the temperature.

In some embodiments, the color change is in a reversible temperature cycle of from 0° C. to 100° C.

In some embodiments, the curcumin oil includes curcumin, bisdemethoxycurcumin, bisdeshydroxybisdemethoxycurcumin, and desmethoxycurcumin.

In some embodiments, the curcumin is present in the curcumin oil in an amount of 70 weight percentage (wt. %) to 99.9 wt. % based on a total weight of the curcumin oil.

In some embodiments, the cyano derivative of poly(phenylenevinylene) is PDH-CN.

In some embodiments, the thermo-responsive polymer composition further includes a compound of formula (IV)

Formula (IV)

In some embodiments, the cyano derivative of poly(phenylenevinylene) is PDH-CN.

In some embodiments, the thermo-responsive polymer composition further includes a compound of formula (V)

Formula (V)

In some embodiments, the cyano derivative of poly(phenylenevinylene) is PDH-CN.

In some embodiments, the thermo-responsive polymer composition further includes a compound of formula (VI).

Formula (VI)

In some embodiments, a ratio of the cyano derivative of poly(phenylenevinylene) to the exciplex formation present in the thermo-responsive polymer composition is in a range of 100:1 to 1:100.

In another exemplary embodiment, a thermo-responsive sensing system is described. The thermo-responsive sensing system includes the aforementioned thermoluminescence sensor as a photon source, a photomultiplier tube (PMT) operatively configured to the thermoluminescence sensor, and a heat transfer plate in thermal communication with the thermoluminescence sensor. In some embodiments, the heat transfer plate is configured to transfer thermal energy between a thermal source and the thermoluminescence sensor.

In yet another exemplary embodiment, the PMT is described. The PMT includes a lens, a photocathode configured to receive photons from the thermoluminescence sensor and to emit photoelectrons, and a plurality of dynodes. In some embodiments, each of the plurality of dynodes is configured to receive photoelectrons from the previous dynode and to emit more photoelectrons than received. In some further embodiments, an anode configured to receive photoelectrons emitted from a last dynode and to output an electrical detection signal. In some further embodiments, the PMT includes an electrical output configured to receive the electrical detection signal from the anode and to convert it to an output signal of the thermoluminescence sensor.

In yet another exemplary embodiment, a method for measuring temperature is described. The method includes receiving a temperature of an object to be measured by the aforementioned thermo-responsive sensing system. In some further embodiments, the thermo-responsive sensing system is in thermal communication with the object via the heat transfer plate.

In some embodiments, the method of measuring temperature further includes preparing the thermo-responsive polymer composition by mixing and heating the curcumin oil and the cyano derivative of poly(phenylenevinylene) until homogenous.

In some embodiments, the heating is performed at a temperature of 40 to 70° C.

The foregoing general description of the illustrative present disclosure and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

When describing the present disclosure, the terms used are to be construed in accordance with the following definitions, unless a context dictates otherwise.

Embodiments of the present invention will now be described more fully hereinafter with reference to the accompanying drawings wherever applicable, in that some, but not all embodiments of the disclosure are shown.

In the drawings, like reference numerals designate identical or corresponding parts throughout the several views. Further, as used herein, the words "a," "an" and the like generally carry a meaning of "one or more," unless stated otherwise.

As used herein, the words "about," "approximately," or "substantially similar" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), +/−15% of the stated value (or range of values), or +/−20% of the stated value (or range of values). Within the description of this disclosure, where a numerical limit or range is stated, the endpoints are included unless stated otherwise. Also, all values and subranges within a numerical limit or range are specifically included as if explicitly written out.

A weight percent of a component, unless specifically stated to the contrary, is based on the total weight of the formulation or composition in which the component is included. For example, if a particular element or component in a composition or article is said to have 5 wt. %, it is understood that this percentage is in relation to a total compositional percentage of 100%.

The use of the terms "include," "includes", "including," "have," "has," or "having" should be generally understood as open-ended and non-limiting unless specifically stated otherwise.

As used herein, the term "compound" generally refers to a chemical entity, whether as a solid, liquid, or gas, and whether in a crude mixture or isolated and purified.

As used herein, the term "room temperature" or "ambient temperature" generally refers to a temperature in a range of 25 degrees Celsius (° C.)±3° C. in the present disclosure.

As used herein, the term "thermoluminescence" generally refers to a form of luminescence exhibited by certain crystalline materials. It occurs when previously absorbed energy from radiation is re-emitted as light upon heating the material.

As used herein, the term "thermoresponsive polymers" generally refers to the type of polymers that undergo significant and abrupt changes in their physical properties when subjected to changes in temperature.

As used herein, the term "light" generally refers to radiation emitted at optical wavelengths. The term "optical wavelengths" is defined as wavelengths that include the part of the spectrum extending from the near-infrared, through the visible, to the ultraviolet. It is further defined to also include radiation emitted at the parts of the spectrum, which extends from the near-infrared through the long wavelength, far infrared, and from the ultraviolet to X-rays and 7-rays at the shortest wavelengths.

As used herein, the term "visible" generally refers to radiation that stimulates the optical receptors of the eye and has a wavelength between about 380 nanometres (nm) to 750 nm.

As used herein, the term "sensor" generally refers to a device that detects and responds to a certain type of input from the physical environment.

As used herein, the term "polymer" generally includes homopolymers, co-polymers, oligomers, telomers, macromers, and pre-polymers.

As used herein, the term "co-polymer" generally refers to a polymer derived from more than one species of monomer, including co-polymers that are obtained by co-polymerization of two monomer species, those obtained from three monomers species ("terpolymers"), those obtained from four monomers species ("quaterpolymers"), etc.

As used herein, the term "substituted" generally refers to at least one hydrogen atom replaced with a non-hydrogen group, provided that normal valences are maintained and the substitution results in a stable compound. When a substituent is noted as "optionally substituted", the substituents are selected from the exemplary group including, but not limited to, halo, hydroxyl, alkoxy, oxo, alkanoyl, aryloxy, alkanoyloxy, amino, alkylamino, arylamino, arylalkylamino, disubstituted amines (e.g. in which the two amino substituents are selected from the exemplary group including, but not limited to, alkyl, aryl or arylalkyl), alkanylamino, aroylamino, aralkanoylamino, substituted alkanoylamino, substituted arylamino, aubstituted aralkanoylamino, thiol, alkylthio, arylthio, arylalkylthio, alkylthiono, arylthiono, aryalkylthiono, alkylsulfonyl, arylsulfonyl, arylalkylsulfonyl, sulfonamide (e.g. —SO$_2$NH$_2$), substituted sulfonamide, nitro, cyano, carboxy, carbamyl (e.g. —CONH$_2$), substituted carbamyl (e.g. CONHalkyl, —CONHaryl, —CONHarylalkyl or cases where there are two substituents on one nitrogen from alkyl, aryl, or alkylalkyl), alkoxycarbonyl, aryl, substituted aryl, guanidine, heterocyclyl (e.g. indolyl, imidazoyl, furyl, thienyl, thiazolyl, pyrrolidyl, pyridyl, pyrimidiyl, pyrrolidinyl, piperidinyl, morpholinyl, piperazinyl, homopiperazinyl and the like), substituted heterocyclyl and mixtures thereof and the like. The substituents may be optionally substituted and may be either unprotected or protected as necessary, as known to those skilled in the art, for example, as taught.

As used herein, the term "alkyl" unless otherwise specified refers to both branched and straight chain saturated aliphatic primary, secondary, and/or tertiary hydrocarbons of typically $C_1$ to $C_{20}$, preferably $C_6$-$C_{18}$, more preferably $C_{10}$-$C_{16}$, for example $C_1$, $C_2$, $C_3$, $C_4$, $C_5$, $C_6$, $C_7$, $C_8$, $C_9$, $C_{10}$, $C_{11}$, $C_{12}$, and specifically includes, but is not limited to, methyl, trifluoromethyl, ethyl, propyl, isopropyl, cyclopropyl, butyl, isobutyl, t-butyl, pentyl, cyclopentyl, isopentyl, neopentyl, hexyl, isohexyl, cyclohexyl, cyclohexylmethyl, 3-methylpentyl, 2,2-dimethylbutyl, 2,3-dimethylbutyl, 2-ethylhexyl, heptyl, octyl, nonyl, 3,7-dimethyloctyl, decyl, undecyl, dodecyl, tridecyl, 2-propylheptyl, tetradecyl, pentadecyl, hexadecyl, heptadecyl, octadecyl, nonadecyl, and eicosyl. As used herein, the term optionally includes substituted alkyl groups. Exemplary moieties with which the alkyl group can be substituted may be selected from the group including, but not limited to, hydroxyl, amino, alkylamino, arylamino, alkoxy, aryloxy, nitro, cyano, sulfonic acid, sulfate, phosphonic acid, phosphate, halo, or phosphonate or mixtures thereof. The substituted moiety may be either protected or unprotected as necessary, as known to those skilled in the art.

The present disclosure is intended to include all hydration states of a given compound or formula, unless otherwise noted or when heating a material.

As used herein, the term "optionally" generally refers to includes substituted alkyl groups. The examples include, but are not limited to, hydroxy, amino, alkylamino, arylamino, alkoxy, aryloxy, nitro, cyano, sulfonic acid, sulfate, phosphonic acid, phosphate, halo, or phosphonate or mixtures thereof. The substituted moiety may be either protected or unprotected as necessary, as known to those skilled in the art.

As used herein, the term "cycloalkyl" generally refers to cyclized alkyl groups. Suitable examples of cycloalkyl groups include but are not limited to, cyclopropyl, cyclobutyl, cyclopentyl, cyclohexyl, norbornyl, and adamantly, 1-methylcyclopropyl and 2-methylcyclopropyl.

As used herein, the term "alkoxy" generally refers to a straight or branched chain alkoxy including, but not limited to, methoxy, ethoxy, propoxy, isopropoxy, butoxy, isobutoxy, secondary butoxy, tertiary butoxy, pentoxy, isopentoxy, hexyloxy, heptyloxy, octyloxy, nonyloxy, and decyloxy.

As used herein, the term "aryl" unless otherwise specified generally refers to functional groups or substituents derived from an aromatic ring including, but not limited to, phenyl, biphenyl, napthyl, thienyl, and indolyl.

As used herein, the term "halogen" generally refers to fluorine, chlorine, bromine and iodine.

Aspects of the present disclosure are directed to a thermoluminescence sensor produced from a conjugated polymer poly(2,5-di(hexyloxy)cyanoterephthalylidene) (PDH-CN) in curcumin oil. The thermoluminescence sensor of the present disclosure can be used in a liquid-state or in a solid-state without any significant alterations in the optical characteristics.

In some embodiments, the thermoluminescence sensor includes a thermo-responsive polymer composition and a sealed transparent container (herein referred to as a container) that holds the thermo-responsive polymer composition (also referred to as the composition). In some embodiments, the container may be made of a glass material and/or a glass-ceramic material in proper shape including, but not limited to, a sphere, a hemisphere, a cylinder, a cone (including frustoconical shapes), a box or a cube, a circle, a square or rectangle, and a triangle. Other shapes are also possible. In some further embodiments, the container may be a transparent plastic container in proper shape. The transparent plastic container may be made of a transparent plastic including, but not limited to polymerized methyl methacrylate. In some embodiments, the container seals the inside of the container from the outside of the container.

In some embodiments, the thermo-responsive polymer composition takes up more than 50% of inner space of the sealed transparent container based on a total volume of the sealed transparent container, preferably more than 70%, preferably more than 90%, or even more preferably more than 99% of the inner space of the sealed transparent container based on the total volume of the sealed transparent container. Other ranges are also possible.

In some embodiments, the composition includes a curcumin oil and a cyano derivative of poly(phenylenevinylene). Curcumin oil is a green solvent with an ultraviolet-visible (UV-Vis) absorbance in the 400-500 nm range, preferably 420-480 nm, preferably 440-460 nm, or even more preferably about 450 nm, giving it a characteristic yellow color. It has strong fluorescence properties, can emit green fluorescence under UV light, and can act as a sensitizing agent. The curcumin oil includes curcumin, bisdemethoxycurcumin, bisdeshydroxybisdemethoxycurcumin, and desmethoxy curcumin. In some embodiments, the weight percentage (wt. %) of curcumin in the curcumin oil is in an amount of 70-99.9 wt. %, preferably 71-99 wt. %, preferably 72-98 wt. %, preferably 73-97 wt. %, preferably 74-96 wt. %, preferably 75-95 wt. %, preferably 76-94 wt. %, preferably 77-93 wt. %, preferably 78-92 wt. %, preferably 79-91 wt. %, preferably 80-90 wt. %, preferably 81-89 wt. %, preferably 82-88 wt. %, preferably 83-87 wt. %, and preferably 84-86 wt. %, based on the total weight of the curcumin oil. Other ranges are also possible.

The cyano derivative of poly(phenylenevinylene) is a compound of formula (I).

Formula [I]

In some embodiments, at least a portion of the cyano derivative of poly(phenylenevinylene) is in the form of an exciplex with the curcumin oil. The alkyl side chains of the cyano derivative of poly(phenylenevinylene) form a hydrogen bond with the oxygen atom of the β-diketone of the carbonyl group in the curcumin oil, forming an exciplex. In some embodiments, the exciplex has formula (II)

Formula [II]

In both the compounds of Formula I and Formula II, $R_1$, $R_2$, $R_3$, and $R_4$ are each independently selected from $C_1$-$C_9$ alkyl, $C_1$-$C_9$ alkenyl, $C_2$-$C_9$ alkynyl, $C_1$-$C_6$ alkyloxy-$C_1$-$C_6$ alkyl, $C_1$-$C_6$ alkylthio-$C_1$-$C_6$ alkyl, and $C_1$-$C_6$ alkylamino-$C_1$-$C_6$ alkyl. Each of the carbon-containing radicals may be optionally substituted with one or more halogen atoms, and n is a positive integer, preferably 2-500, preferably 10-490, preferably 20-480, preferably 30-470, preferably 40-460, preferably 50-450, preferably 60-440, preferably 70-430, preferably 80-420, preferably 90-410, preferably 100-400, preferably 110-390, preferably 120-380, preferably 130-370, preferably 140-360, preferably 150-350, preferably 160-340, preferably 170-330, preferably 180-320, preferably 190-310, preferably 200-300, preferably 210-290, preferably 220-280, preferably 230-270, and preferably 240-260. Other ranges are also possible.

The ratio of the cyano derivative of poly(phenylenevinylene) to the exciplex formation in the thermo-responsive polymer composition is in a range of 100:1-1:100, preferably 90:1-1:90, preferably 80:1-1:80, preferably 70:1-1:70, preferably 60:1-1:60, preferably 50:1-1:50, preferably 40:1-1:40, preferably 30:1-1:30, preferably 20:1-1:20, and preferably 10:1-1:10. Other ranges are also possible.

In an embodiment, the cyano derivative of poly(phenylenevinylene) is poly(2,5-di(hexyloxy)cyanoterephthalylidene) (PDH-CN). The exciplex formation has a formula (III)

Formula [III]

In an embodiment, the cyano derivative of poly(phenylenevinylene) is PDH-CN, and the thermo-responsive polymer composition further includes a compound of formula (IV)

Formula (IV)

In an embodiment, the cyano derivative of poly(phenylenevinylene) is PDH-CN, and the thermo-responsive polymer composition further includes a compound of formula (V)

Formula (V)

In an embodiment, the cyano derivative of poly(phenylenevinylene) is PDH-CN, and the thermo-responsive polymer composition further includes a compound of formula (VI)

Formula (VI)

In the compounds of formula (III), (IV), (VI), and (VI), n is a positive integer, preferably 2-500, preferably 10-490, preferably 20-480, preferably 30-470, preferably 40-460, preferably 50-450, preferably 60-440, preferably 70-430, preferably 80-420, preferably 90-410, preferably 100-400, preferably 110-390, preferably 120-380, preferably 130-370, preferably 140-360, preferably 150-350, preferably 160-340, preferably 170-330, preferably 180-320, preferably 190-310, preferably 200-300, preferably 210-290, preferably 220-280, preferably 230-270, and preferably 240-260. Other ranges are also possible.

In some embodiments, a molar ratio of the exciplex of formula (II) to the compound of formula (III) present in the thermo-responsive polymer composition is about 10:1 to 500:1, preferably 50:1 to 400:1, preferably 100:1 to 300:1, or even more preferably about 200:1. In some preferred embodiments, a molar ratio of the exciplex of formula (II) to the compound of formula (IV) is about 10:1 to 500:1, preferably 50:1 to 400:1, preferably 100:1 to 300:1, or even more preferably about 200:1. In some further preferred embodiments, a molar ratio of the exciplex of formula (II) to the compound of formula (V) is about 10:1 to 500:1, preferably 50:1 to 400:1, preferably 100:1 to 300:1, or even more preferably about 200:1. In some most preferred embodiments, a molar ratio of the exciplex of formula (II) to the compound of formula (VI) is about 10:1 to 500:1, preferably 50:1 to 400:1, preferably 100:1 to 300:1, or even more preferably about 200:1. Other ranges are also possible.

In some embodiments, the thermo-responsive polymer composition is in a solid form. In some embodiments, the solid form thermo-responsive polymer composition further include a thermoplastic polymer. Suitable examples of thermoresponsive polymers include polymethyl methacrylate (PMMA), poly (N-isopropylacrylamide) (PNIPAAm), poly (N,N-diethylacrylamide) (PDEAAm), poly(N-vinlycaprolactam) (PVCL), derivatives of poly(phenylenevinylene), poly(2-(dimethylamino)ethyl methacrylate) (PDMAEMA), poly(DEAM-co-DMAM), poly(ethylene oxide) (PEO), poly(diethylacrylamide-co-dimethylacrylamide), or poly(methoxyethoxy)ethyl methacrylate-co-oligo(ethylene glycol) methacrylate, poly($MEO_2MA$-co-OEGMA), and combinations thereof. In some preferred embodiments, the thermoresponsive polymer is polymethyl methacrylate (PMMA).

In some embodiments, the thermoplastic polymer is present in the thermo-responsive polymer composition at a concentration of 5 to 60 wt. %, preferably 8 to 55 wt. %, preferably 11 to 50 wt. %, preferably 14 to 45 wt. %, preferably 17 to 40 wt. %, preferably 20 to 35 wt. %, or even more preferably 25 to 30 wt. %, based on the total weight of the thermoplastic polymer. Other ranges are also possible. In this case, the thermo-responsive polymer composition in a solid form may be used in the absence of the sealed transparent container. In some preferred embodiments, the thermo-responsive polymer composition in a solid form may be in any shape including, but not limited to, a sphere, a hemisphere, a cylinder, a cone (including frustoconical shapes), a box or a cube, a circle, a square or rectangle, and a triangle. Other shapes are also possible.

A method of preparing the thermo-responsive polymer composition is also provided. The method includes mixing and heating the curcumin oil and the cyano derivative of poly(phenylenevinylene) until it becomes homogenous. The mixing may be carried out manually or with the help of a stirrer. The heating can be done by using heating appliances such as hot plates, heating mantles, ovens, microwaves, autoclaves, tapes, oil baths, salt baths, sand baths, air baths, hot-tube furnaces, and hot-air guns. In some embodiments, the heating is performed at a temperature of 40-70° C., preferably 41-69° C., preferably 42-68° C., preferably 43-67° C., preferably 44-66° C., preferably 45-65° C., preferably 46-64° C., preferably 47-63° C., preferably 48-62° C., preferably 49-61° C., preferably 50-60° C., preferably 51-59° C., preferably 52-58° C., preferably 53-57° C., and preferably 54-56° C. In a preferred embodiment, the heating is performed at a temperature of 50° C.

In some further embodiments, the method of preparing the thermo-responsive polymer composition in a solid form may include mixing and heating the curcumin oil, the cyano derivative of poly(phenylenevinylene), and a polymethyl methacrylate (PMMA) polymer to form a mixture. The method further includes introducing the mixture into a mold to form a sample, and curing the sample by cooling to form a solid state thermo-responsive polymer composition in the mold.

In another aspect of the present disclosure, a thermo-responsive sensing system is described. The thermo-responsive sensing system includes the aforementioned thermoluminescence sensor as a photon source, a photomultiplier tube (PMT) operatively configured to the thermoluminescence sensor, and a heat transfer plate in thermal communication with the thermoluminescence sensor. The PMT further includes a lens, a photocathode configured to receive photons from the thermoluminescence sensor and for emitting photoelectrons, and a plurality of dynodes. Each of the plurality of dynodes is configured to receive photoelectrons from the previous dynode and to emit more photoelectrons than received. Further, an anode is configured to receive photoelectrons emitted from a last dynode and to output an electrical detection signal. Furthermore, the PMT includes an electrical output configured to receive the electrical detection signal from the anode and convert it to an output signal of the thermoluminescence sensor. The heat transfer plate is configured to transfer thermal energy between a thermal source and the thermoluminescence sensor.

In another aspect of the present disclosure, a method for measuring temperature is described. The method includes receiving the temperature of an object to be measured by the aforementioned thermo-responsive sensing system. The thermo-responsive sensing system is in thermal communication with the object via the heat transfer plate.

In some embodiments, the sensor exhibits a temperature-dependent emission intensity in a range of from 450-800 nm, preferably 500-750 nm, preferably 550-700 nm, and preferably 600-650 nm at a temperature of 0-100° C., preferably 5-95° C., preferably 10-90° C., preferably 15-85° C., preferably 20-80° C., preferably 25-75° C., preferably 30-70° C., preferably 35-65° C., preferably 40-60° C., and preferably 45-55° C. as determined by optical spectrum. In some embodiments, the sensor exhibits a temperature-dependent emission intensity in a range of from 535-600 nm, preferably 540-595 nm, preferably 545-590 nm, preferably 550-585 nm, preferably 555-580 nm, preferably 560-575 nm, and preferably 565-570 nm at a temperature of 0-100° C., preferably 5-95° C., preferably 10-90° C., preferably 15-85° C., preferably 20-80° C., preferably 25-75° C., preferably 30-70° C., preferably 35-65° C., preferably 40-60° C., and preferably 45-55° C. Other ranges are also possible.

In some embodiments, there is a linear correlation between the operation temperature of the sensor and the emission characteristic during thermal cycling. In some embodiments, a color change transition occurs at a temperature of 0-100° C., preferably 5-95° C., preferably 10-90° C., preferably 15-85° C., preferably 20-80° C., preferably 25-75° C., preferably 30-70° C., preferably 35-65° C., preferably 40-60° C., and preferably 45-55° C. The color change transition has an emission intensity from 450-800 nm, 500-750 nm, 550-700 nm, and 600-650 nm as temperature increases. In some embodiments, the color change is in a reversible temperature cycle from 0-100° C., preferably 5-95° C., preferably 10-90° C., preferably 15-85° C., preferably 20-80° C., preferably 25-75° C., preferably 30-70°

C., preferably 35-65° C., preferably 40-60° C., and preferably 45-55° C. Other ranges are also possible.

EXAMPLES

The following examples demonstrate a thermoluminescence sensor including conjugated polymer (PDH-CN) in curcumin oil. The examples are provided solely for illustration and are not to be construed as limitations of the present disclosure, as many variations thereof are possible without departing from the spirit and scope of the present disclosure.

Example 1: Polymer Structures

Figure 1A:
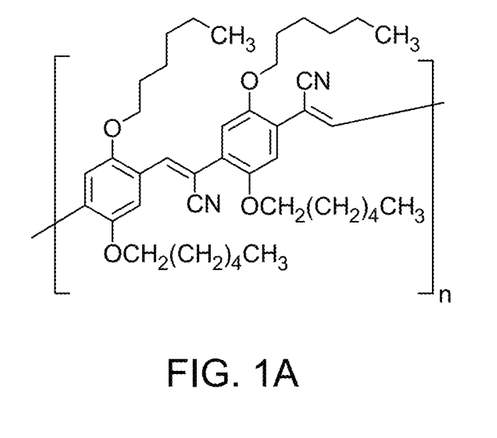
FIG. 1A is a schematic illustration depicting a molecular structure of poly(2,5-di(hexyloxy) cyanoterephthalylidene (PDH-CN), according to certain embodiments.
Figure 1B:
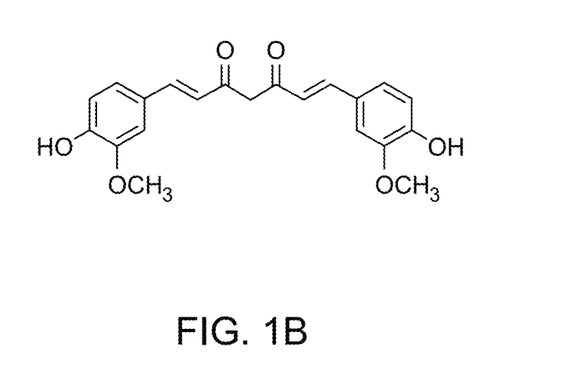
FIG. 1B is a schematic illustration depicting the chemical structure of curcumin oil according to certain embodiments.
Figure 2:
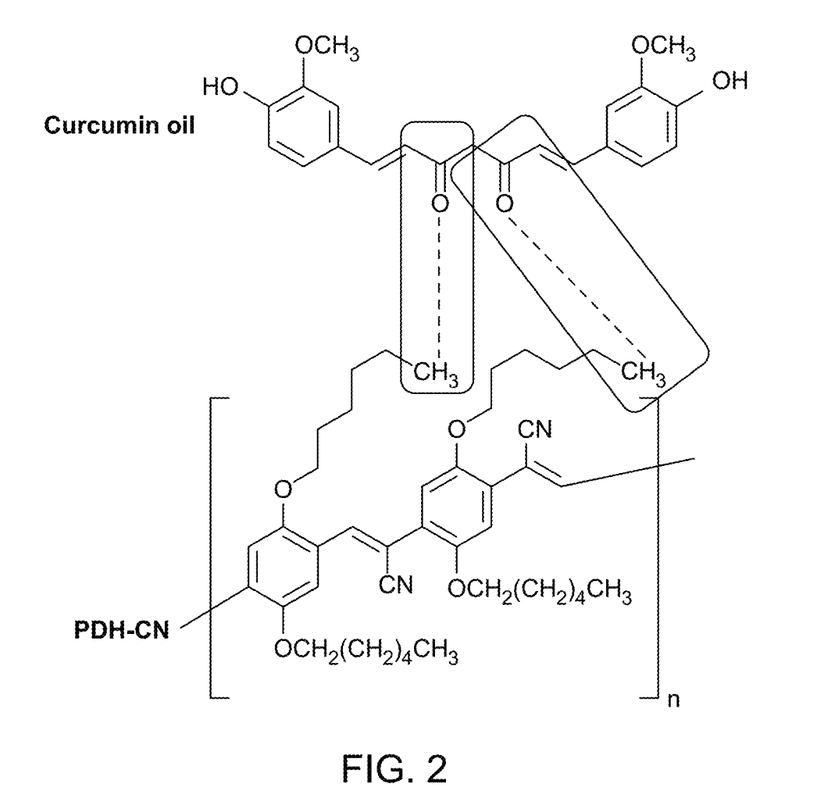
FIG. 2 is a schematic illustration depicting an exciplex formation of PDH-CN in curcumin oil, according to certain embodiments.

Poly(2,5-di(hexyloxy)cyanoterephthalylidene (PDH-CN), is a cyano-derivative of poly(phenylenevinylene). Poly(phenylenevinylene) is a highly conjugated polymer, indicating that it has many delocalized electrons that may move freely along its backbone. In addition, this polymer has two alkyl side groups attached to oxygen atoms, which are stretched directly in space. FIG. 1A depicts the molecular structure of the aforementioned polymer. Further, the molecular structure of curcumin oil is shown in FIG. 1B. The curcumin oil includes two aromatic rings linked by o-methoxy phenolic groups and a β-diketone moiety as a central linker. The latter is involved in the color and stability of curcumin and plays a crucial role in dipole-dipole interactions. Furthermore, in an excited state, the alkyl side chains of PDH-CN may form a hydrogen bond with the oxygen atom of the β-diketone of the carbonyl group in the curcumin oil, resulting in the formation of an exciplex as depicted in FIG. 2.

Example 2: Synthesis of Thermoluminescence Sensor

Figure 3:
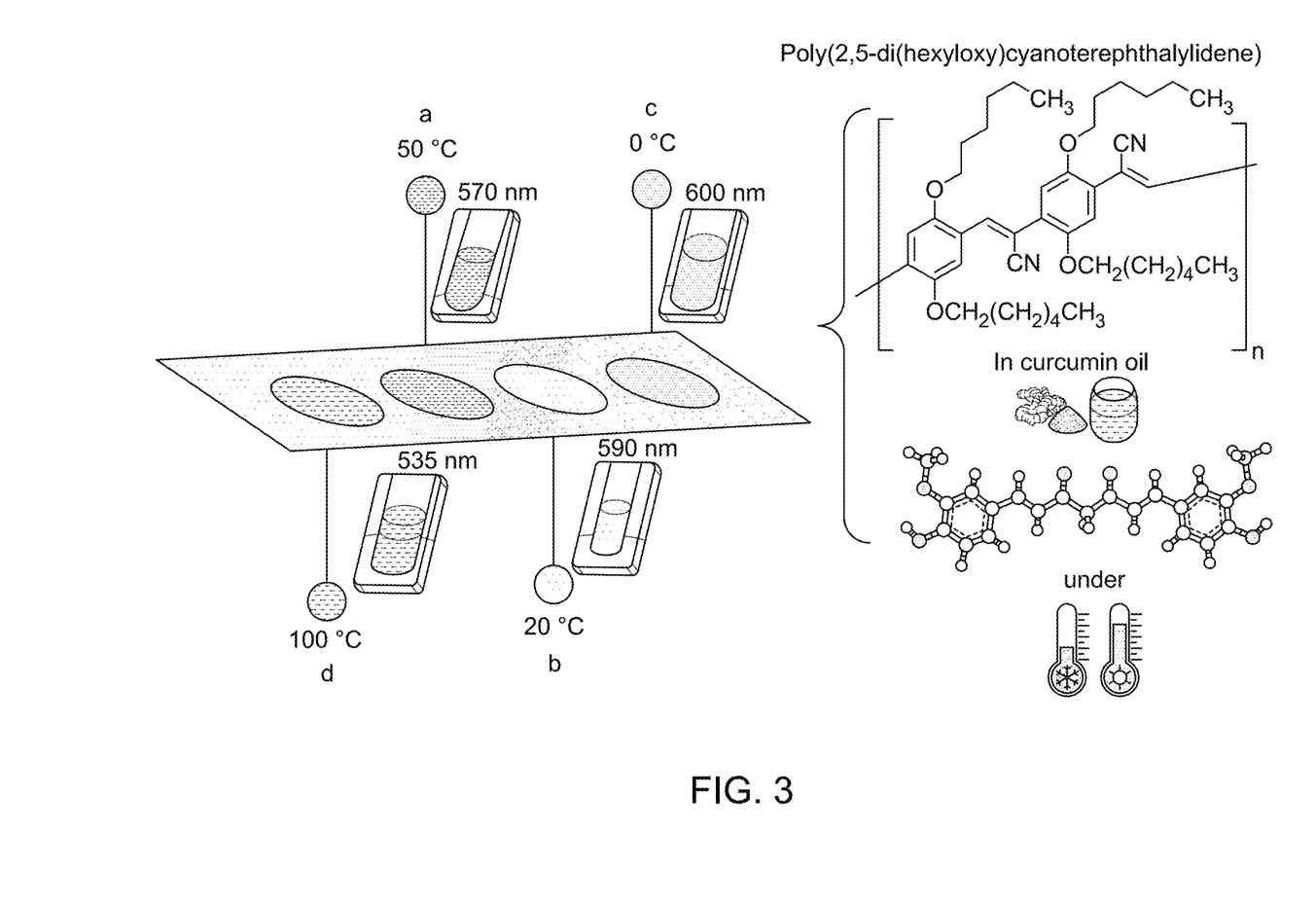
FIG. 3 depicts a sensor displaying thermal-influenced fluorescence at various temperatures, according to certain embodiments.
Figure 4A:
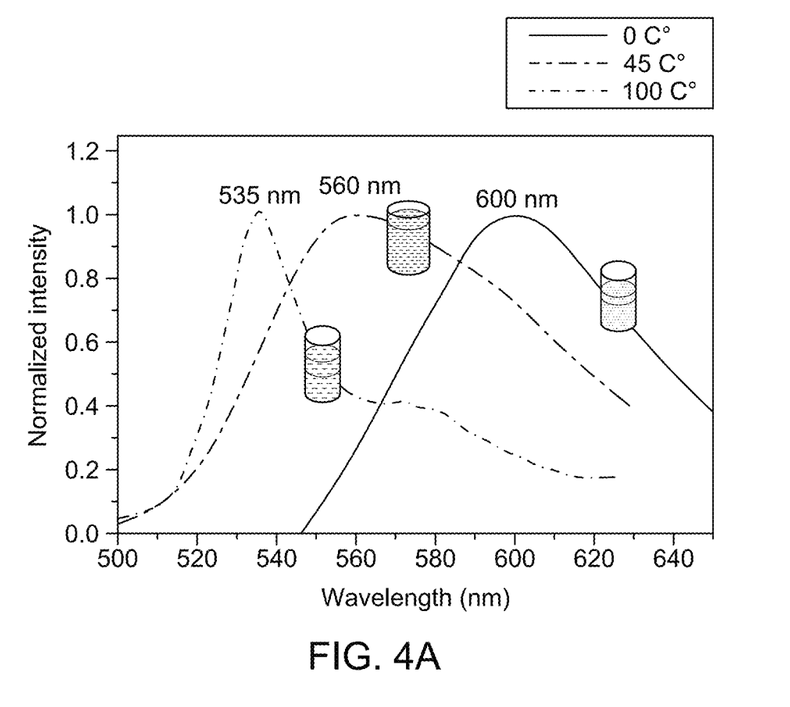
FIG. 4A depicts optical spectra and corresponding digital images of the sensor at a plurality of temperatures, according to certain embodiments.
Figure 4B:
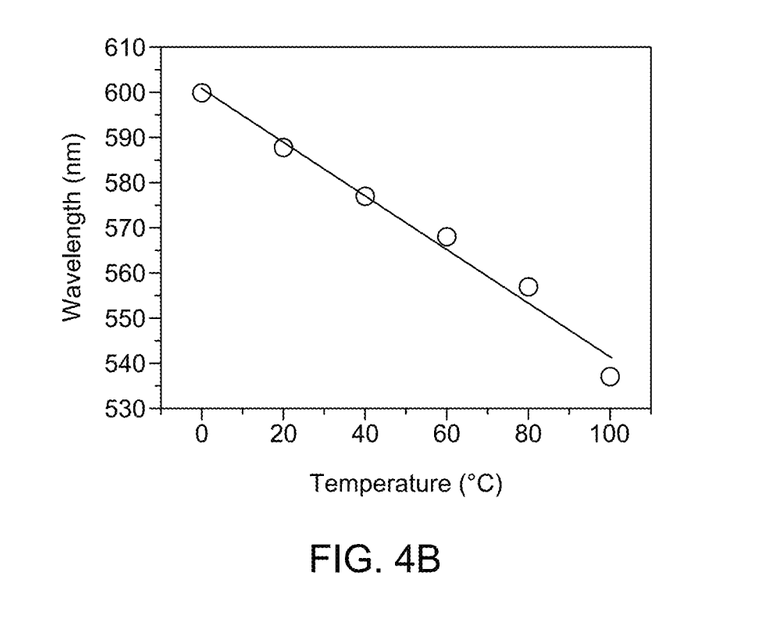
FIG. 4B depicts a linear correlation between a measured wavelength as a function of supplied temperature, according to certain embodiments.
Figure 5:
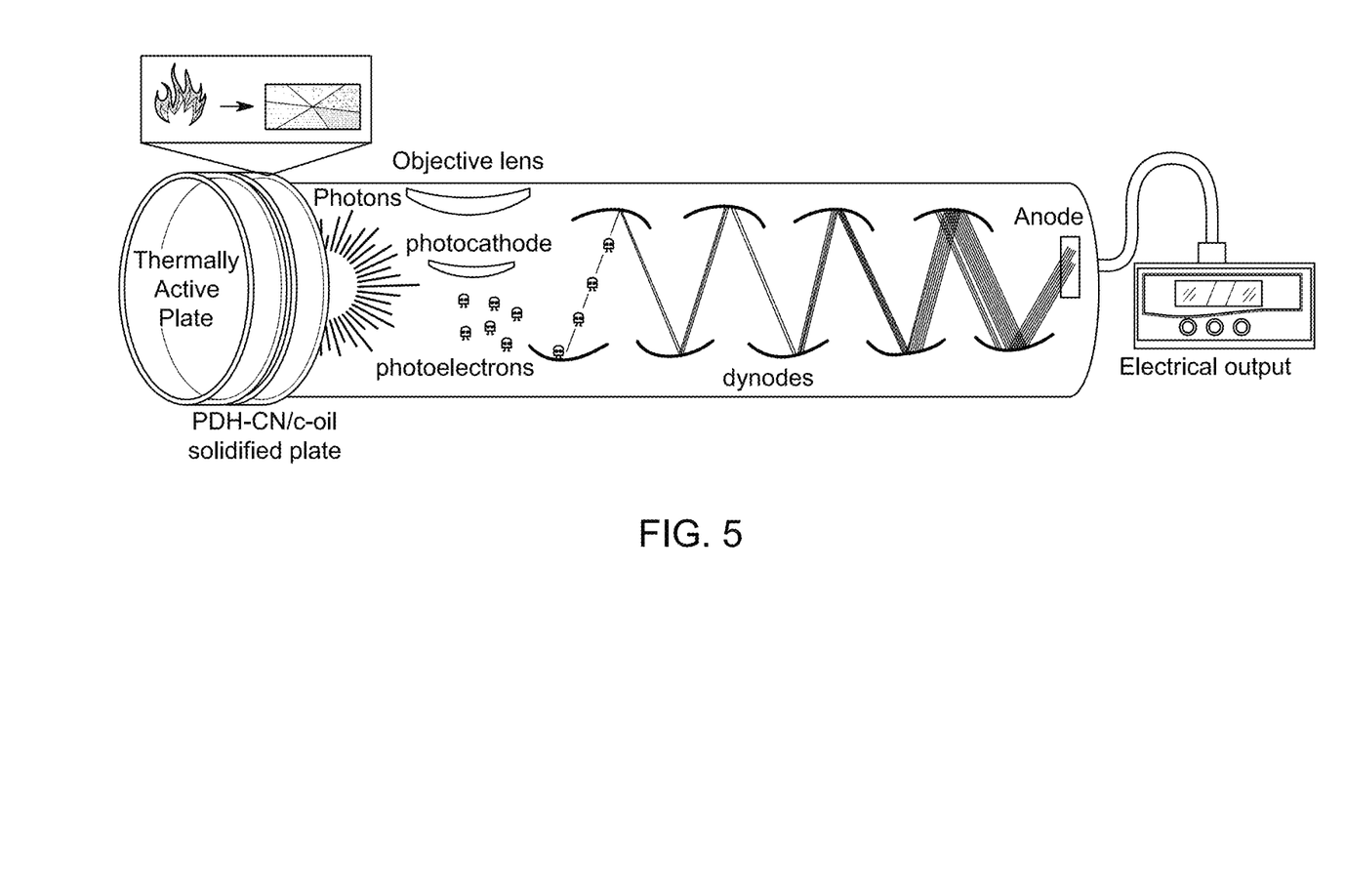
FIG. 5 is a schematic diagram illustrating a prototype of solidified PDH-CN in curcumin oil as a photon source in a photomultiplier tube (PMT), according to certain embodiments.

In one embodiment, about 15 milligrams (mg) of the polymer PDH-CN was dissolved in 5 milliliters (mL) of curcumin oil while being continuously stirred at 50° C. until a homogeneous solution was obtained (3 mg/mL). The resulting mixture may exhibit a golden color. Further, the mixture was allowed to cool to room temperature (around 20° C.) while its optical changes were monitored (a), as depicted in FIG. 3. When the temperature equilibrated with the ambient temperature, the color gradually transitioned from a light yellow to a darker orange (b), as depicted in FIG. 3. Furthermore, thermo-optical analysis was performed by reducing the temperature to 0° C., resulting in the mixture acquiring a dark red color (c), as depicted in FIG. 3. The mixture was then cooled again before the temperature was raised to 100° C. Moreover, the mixture followed the nearly identical optical trend during the thermal process, eventually displaying a light green color at 100° C. (d), as depicted in FIG. 3. From the aforementioned observations, it may be shown that upon reversible temperature alterations (heating-cooling cycles, 0° C. to 100° C.), PDH-CN/curcumin oil aqueous solution exhibits temperature-dependent emission characteristics from (about 535 nm to 600 nm). This may lead to a sharp change in the photophysical properties of the complex that provide an output signal for a thermo-optical sensor, as shown in FIG. 4A and FIG. 4B. A model of a solid-state thermoluminescence sensor developed from conjugated polymer (PDH-CN) in curcumin oil, as shown in FIG. 5.

Figure 6:
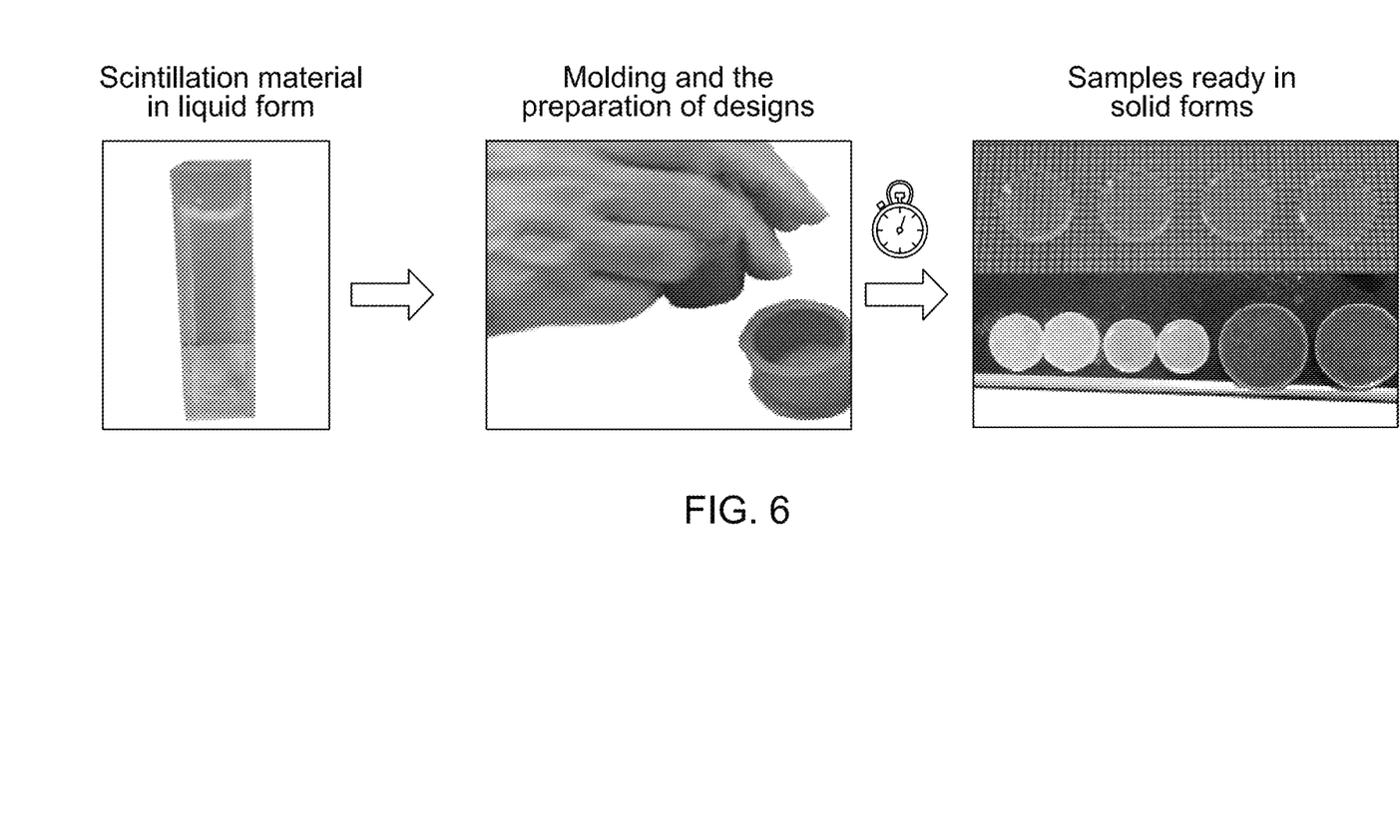
FIG. 6 is a schematic illustration depicting a solidification process of a scintillation material, according to certain embodiments.

A solid-state form of the liquid-state thermoluminescence sensor was created by solidifying the mixture into cubes or bullets with predetermined dimensions. To achieve this, a polymer matrix material such as, but not limited to, Perspex liquid or PMMA was combined with the liquid-state thermoluminescence sensor to create the solid-state phase. The liquid-state thermoluminescence sensor was mixed with different ratios of a commercial transparent polymer and formed into three-dimensional (3D) solid cylinders. The solidification process is depicted in FIG. 6. Furthermore, after the liquid-to-solid transition, any significant alterations in the optical characteristics of the thermo-optical sensor were not noticed.

Aspects of the present disclosure are directed towards a conjugated polymer of PDH-CN, dissolved in curcumin oil and subjected to the solution to a temperature range of 0° C. to 100° C. The optical and spectroscopic changes in the solution were monitored as the temperature varied. The results indicate that the temperature change induces a significant fluorescence color shift in the conjugated polymer. This discovery shows this sensor may be used as a reversible thermo-optical probe, suitable for heating and cooling cycles. The liquid phase of the mixture, including PDH-CN in curcumin oil, demonstrates improved optical behavior, showing a real-time response to temperature changes.

Numerous modifications and variations of the present disclosure are possible in light of the above teachings. It is, therefore, to be understood that within the scope of the appended claims, the invention may be practiced otherwise than as specifically described herein.

The invention claimed is:

1. A thermoluminescence sensor, comprising:
a thermo-responsive polymer composition, and a sealed transparent container that holds the thermo-responsive polymer composition;
wherein the thermo-responsive polymer composition comprises:
a curcumin oil;
a cyano derivative of poly(phenylenevinylene) of formula (I)

Formula [I]

wherein at least a portion of the cyano derivative of poly(phenylenevinylene) is in the form of an exciplex with the curcumin oil, wherein the exciplex has formula (II)

Formula [II]

wherein $R_1$, $R_2$, $R_3$, and $R_4$ are each independently selected from the group consisting of $C_1$-$C_9$ alkyl, $C_1$-$C_9$ alkenyl, $C_2$-$C_9$ alkynyl, $C_1$-$C_6$ alkyloxy-$C_1$-$C_6$ alkyl, $C_1$-$C_6$ alkylthio-$C_1$-$C_6$ alkyl, and $C_1$-$C_6$ alkylamino-$C_1$-$C_6$ alkyl, wherein each of the carbon-containing radicals is optionally substituted with one or more halogen atoms, and wherein n is a positive integer.

2. The thermoluminescence sensor of claim 1, wherein the cyano derivative of poly(phenylenevinylene) is poly(2,5-di(hexyloxy)cyanoterephthalylidene (PDH-CN), and wherein the exciplex formation has a formula (III)

Formula [III]

3. The thermoluminescence sensor of claim 1, wherein the sensor exhibits a temperature-dependent emission intensity in a range of from 450 nanometers (nm) to 800 nm at a temperature of 0 degree Celsius (° C.) to 100° C., as determined by optical spectrum.

4. The thermoluminescence sensor of claim 3, wherein the sensor exhibits a temperature-dependent emission intensity in a range of from 535 nm to 600 nm at a temperature of 0° C. to 100° C.

5. The thermoluminescence sensor of claim 3, wherein there is a linear correlation between the operation temperature of the sensor and the emission characteristic during thermal cycling.

6. The thermoluminescence sensor of claim 1, having a color change transition at a temperature of 0° C. to 100° C., and wherein the color change transition has an emission intensity of from 450 nm to 800 nm as an increase of the temperature.

7. The thermoluminescence sensor of claim 6, wherein the color change is in a reversible temperature cycle of from 0° C. to 100° C.

8. The thermoluminescence sensor of claim 1, wherein the sealed transparent container is made of glass material, and/or glass-ceramic material.

9. A thermo-responsive sensing system, comprising:
    the thermoluminescence sensor of claim 1 as a photon source;
    a photomultiplier tube (PMT) operatively configured to the thermoluminescence sensor;
    a heat transfer plate in thermal communication with the thermoluminescence sensor;
    wherein the heat transfer plate is configured to transfer thermal energy between a thermal source and the thermoluminescence sensor.

10. The thermo-responsive sensing system of claim 9, wherein the PMT further comprises:
    a lens;
    a photocathode configured to receive photons from the thermoluminescence sensor and to emit photoelectrons;
    a plurality of dynodes;
    wherein each of the plurality of dynodes is configured to receive photoelectrons from the previous dynode and to emit more photoelectrons than received;
    an anode configured to receive photoelectrons emitted from a last dynode and to output an electrical detection signal; and
    an electrical output configured to receive the electrical detection signal from the anode and to convert it to an output signal of the thermoluminescence sensor.

11. A method for measuring temperature, comprising:
    receiving a temperature of an object to be measured by the thermo-responsive sensing system of claim 10;
    wherein the thermo-responsive sensing system is in thermal communication with the object via the heat transfer plate.

12. The method of claim 11, further comprising preparing the thermo-responsive polymer composition by:
    mixing and heating the curcumin oil and the cyano derivative of poly(phenylenevinylene) until homogenous.

13. The method of claim 12, wherein the heating is performed at a temperature of 40° C. to 70° C.

14. The thermoluminescence sensor of claim 1, wherein the curcumin oil comprises curcumin, bisdemethoxycurcumin, bisdeshydroxybisdemethoxycurcumin, and desmethoxycurcumin.

15. The thermoluminescence sensor of claim 14, wherein the curcumin is present in the curcumin oil in an amount of 70 weight percentage (wt. %) to 99.9 wt. % based on a total weight of the curcumin oil.

16. The thermoluminescence sensor of claim 14, wherein the cyano derivative of poly(phenylenevinylene) is PDH-CN, and wherein the thermo-responsive polymer composition further comprises a compound of formula (IV)

Formula (IV)

17. The thermoluminescence sensor of claim 14, wherein the cyano derivative of poly(phenylenevinylene) is PDH-CN, and wherein the thermo-responsive polymer composition further comprises a compound of formula (V)

Formula (V)

18. The thermoluminescence sensor of claim 14, wherein the cyano derivative of poly(phenylenevinylene) is PDH-CN, and wherein the thermo-responsive polymer composition further comprises a compound of formula (VI)

Formula (VI)

19. The thermoluminescence sensor of claim 1, wherein a ratio of the cyano derivative of poly(phenylenevinylene) to the exciplex formation present in the thermo-responsive polymer composition is in a range of 100:1 to 1:100.

* * * * *